US012731443B1

(12) United States Patent
Nielsen

(10) Patent No.: US 12,731,443 B1
(45) Date of Patent: Sep. 8, 2026

(54) INTEGRATED COMBAT SPORTS TIMER CAMERA SYSTEM

(71) Applicant: Jabbr Technologies ApS, Copenhagen (DK)

(72) Inventor: Allan Svejstrup Nielsen, Grindsted (DK)

(73) Assignee: Jabbr Technologies ApS, Copenhagen (DK)

( * ) Notice: Subject to any disclaimer, the term of this patent is extended or adjusted under 35 U.S.C. 154(b) by 0 days.

(21) Appl. No.: 19/257,820

(22) Filed: Jul. 2, 2025

(51) Int. Cl.
*G07C 1/28* (2006.01)
*G06V 20/52* (2022.01)
*H04N 5/77* (2006.01)
*H04N 7/18* (2006.01)
*H04N 23/62* (2023.01)

(52) U.S. Cl.
CPC ............... *G07C 1/28* (2013.01); *G06V 20/52* (2022.01); *H04N 5/77* (2013.01); *H04N 7/188* (2013.01); *H04N 23/62* (2023.01); *A63B 2244/10* (2013.01); *H04N 7/181* (2013.01); *H04N 7/183* (2013.01)

(58) Field of Classification Search
CPC . G07C 1/28; G06V 20/52; H04N 5/77; H04N 7/188; H04N 23/62; H04N 7/181; H04N 7/183; A63B 2244/10
USPC .................................. 348/157, 143; 386/234
See application file for complete search history.

(56) References Cited

U.S. PATENT DOCUMENTS 10,277,813 B1 * 4/2019 Thomas ................. H04N 23/90
2014/0049636 A1 * 2/2014 O'Donnell ............. G08C 17/02 348/143
2015/0373306 A1 * 12/2015 Flores ................ H04N 21/6175 348/157
2016/0006974 A1 * 1/2016 Pulkkinen ............. H04N 5/781 386/234
2016/0227127 A1 * 8/2016 Hyttinen ................ H04N 23/51
2016/0261788 A1 * 9/2016 Mizukami ............ H04N 23/633
2016/0292511 A1 * 10/2016 Ayalasomayajula ......................... G06V 40/103
2017/0214982 A1 * 7/2017 Cowherd ................. H04N 5/77
2018/0013975 A1 * 1/2018 Tang .................. H04N 21/4622
2018/0091839 A1 * 3/2018 Sweeney ................ A63B 71/06
2018/0324410 A1 * 11/2018 Roine .................. H04N 23/698
2018/0326283 A1 * 11/2018 Sexton ................... A63B 69/32
2019/0020820 A1 * 1/2019 Kaneko .................. H04N 23/90
2020/0349977 A1 * 11/2020 Anwar ............... H04N 1/00209
2021/0383124 A1 * 12/2021 Imes ...................... G06V 20/42

(Continued)

OTHER PUBLICATIONS

Stefański, P., Jach, T., Kozak, J. (2023). Classification of Punches in Olympic Boxing Using Static RGB Cameras. In: Nguyen, N.T., et al. Computational Collective Intelligence. ICCCI 2023. Lecture Notes in Computer Science(), vol. 14162. Springer, Cham. https://doi.org/10.1007/978-3-031-41456-5_41 (Year: 2023).*

*Primary Examiner* — Thai Q Tran
*Assistant Examiner* — Stephen R Smith
(74) *Attorney, Agent, or Firm* — Blueshift IP; Robert Plotkin

(57) ABSTRACT

An integrated timing and recording system for combat-sports events includes camera devices and a control device. The control device manages a timing session, which includes a timed activity state and a non-timed rest state. The system automatically starts or resumes video recording when the timing session transitions from rest to activity and stops or pauses recording when it transitions back to rest, in response to user inputs through a user interface.

14 Claims, 4 Drawing Sheets

(56) References Cited

U.S. PATENT DOCUMENTS

2022/0238140 A1* 7/2022 Oguchi .................... H04N 5/77
2024/0096318 A1* 3/2024 Wuellner ................ G06F 3/017

* cited by examiner

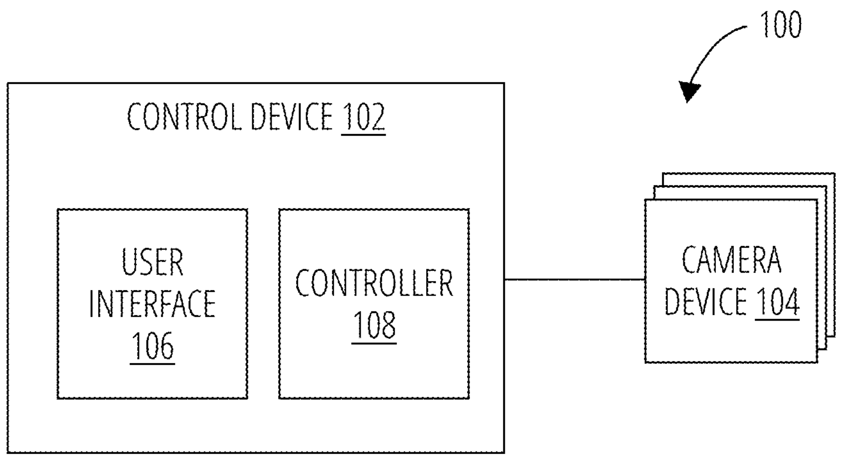

FIG. 1

PROVIDE A USER INTERFACE FOR MANAGING A TIMING SESSION FOR A COMBAT-SPORTS EVENT, THE TIMING SESSION COMPRISING AT LEAST A TIMED ACTIVITY STATE AND A NON-TIMED REST STATE 202

↓

RECEIVE A FIRST USER INPUT VIA THE USER INTERFACE INITIATING A TRANSITION OF THE TIMING SESSION FROM THE NON-TIMED REST STATE TO THE TIMED ACTIVITY STATE 204

↓

IN RESPONSE TO THE FIRST USER INPUT, AUTOMATICALLY TRANSMIT A FIRST COMMAND TO AT LEAST ONE CAMERA DEVICE TO CAUSE IT TO START OR RESUME VIDEO RECORDING 206

↓

RECEIVE A SECOND USER INPUT VIA THE USER INTERFACE INITIATING A TRANSITION OF THE TIMING SESSION FROM THE TIMED ACTIVITY STATE TO THE NON-TIMED REST STATE 208

↓

IN RESPONSE TO THE SECOND USER INPUT, AUTOMATICALLY TRANSMIT A SECOND COMMAND TO THE AT LEAST ONE CAMERA DEVICE TO CAUSE IT TO STOP OR PAUSE VIDEO RECORDING 210

FIG. 2

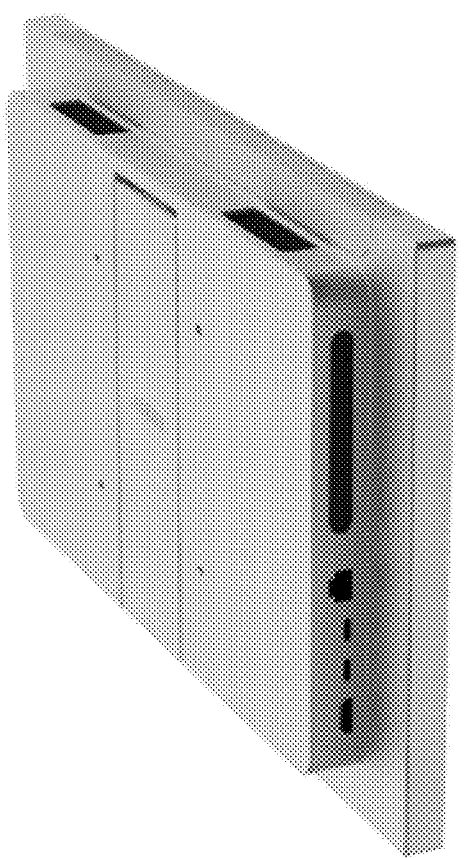
FIG. 5
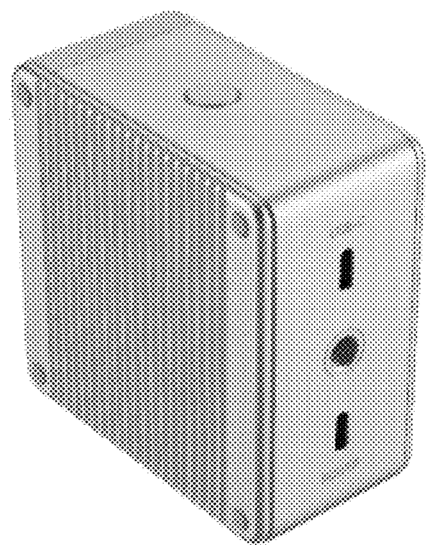
FIG. 6

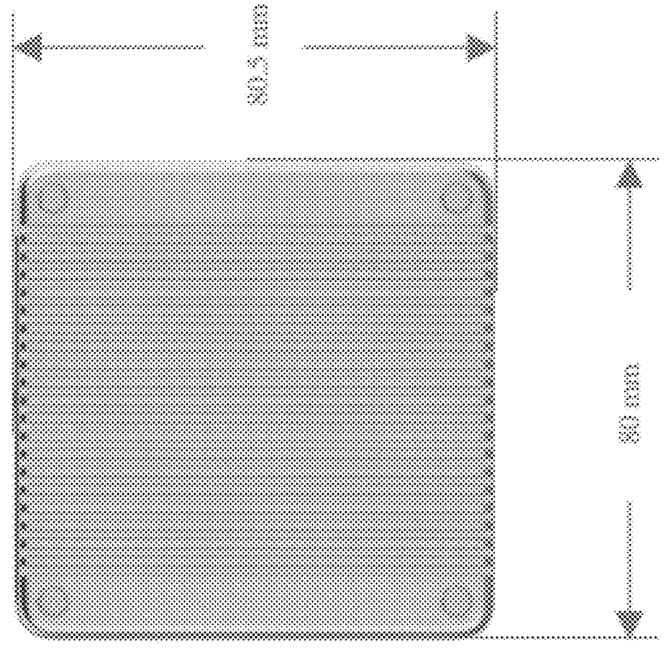
80.5 mm
80 mm
FIG. 7
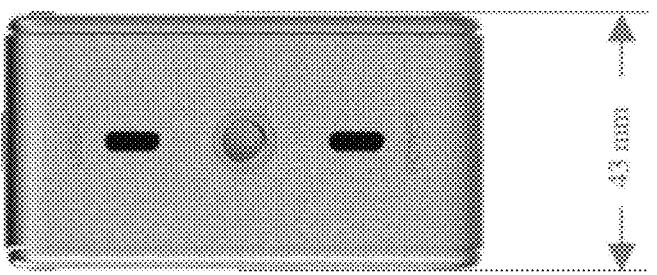
43 mm
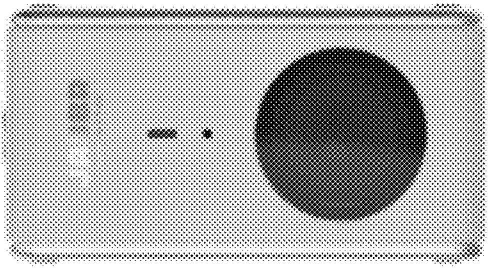

INTEGRATED COMBAT SPORTS TIMER CAMERA SYSTEM

TECHNICAL FIELD

The present disclosure relates to the field of combat-sports equipment, and more specifically to fight timers.

BACKGROUND

Combat sports, including boxing, mixed martial arts, kickboxing, and various other fighting disciplines, have long relied on timed intervals. These timed intervals, typically consisting of active rounds interspersed with rest periods, form the backbone of training regimens and competitive matches across combat sports worldwide.

In training facilities and gyms devoted to combat sports, timing systems have evolved from simple analog stopwatches to sophisticated digital timers capable of managing complex interval structures. These timing systems help coaches and athletes maintain proper training protocols, ensure consistency in workout intensity, prepare participants for the timed nature of competitive matches, and ensure accurate timing during matches.

Separately, video recording has become an increasingly important tool in combat sports. Coaches and athletes regularly record training sessions, sparring matches, and technique drills to analyze performance, identify areas for improvement, and track progress over time. The ability to review movements, techniques, and tactical decisions through video footage has transformed coaching methodologies and accelerated skill development across combat sports disciplines.

Despite the widespread adoption of both timing systems and video recording in combat sports environments, integrating these two essential elements presents numerous challenges. Training facilities often employ separate, uncoordinated systems for timing and recording, creating workflow inefficiencies. Coaches and training partners must divide their attention between managing the timing of sessions and ensuring proper video documentation, potentially compromising the quality of instruction or training.

The independent operation of timing and recording systems frequently leads to missed recording opportunities, as individuals may forget to activate cameras at the beginning of rounds or fail to stop recording during extended breaks. This disconnection between timing and recording systems can result in fragmented footage, wasted storage space, and batteries being depleted during non-essential periods.

Distribution of recorded footage presents additional complications in combat sports settings. When multiple athletes participate in training sessions captured on video, the manual process of sorting, editing, and sharing relevant footage with specific participants can be time-consuming and prone to error.

Furthermore, the temporal context of video footage—such as which round is being shown or when breaks occurred—must normally be manually noted or inferred by viewers. This lack of synchronized timing information can diminish the analytical value of training footage.

For multi-camera setups, the complexity increases exponentially, as each recording device must be independently controlled, risking asynchronous operation and inconsistent documentation of training sessions. Managing multiple cameras requires either additional personnel or creates distractions for coaches and athletes.

The combat sports community has also increasingly sought ways to enhance video footage with additional data layers, such as timing information and participant identification, to improve the utility of recordings for analysis and instruction.

As combat sports continue to evolve with technology playing an increasing role in training methodologies, challenges remain in creating more seamless, efficient, and effective systems for timing and documenting training sessions. Addressing at least some of these issues could significantly enhance the training experience and outcomes for combat sports participants.

SUMMARY OF THE DISCLOSURE

It is an object of embodiments of the present disclosure to streamline workflows associated with combat sports timing and recording.

This and other objectives can be achieved by the subject-matter defined in the independent claims. Advantageous modifications of embodiments of the present disclosure are defined in the dependent claims as well as in the description and the drawings.

In a first aspect, the present disclosure relates to a system for timing and recording combat-sports events. The system may comprise at least one camera device, a control device, or both. Accordingly, the system may be an integrated system, enabling synchronized control of timing sessions and video recording. The system may be designed to facilitate the management of timing and video recording during combat-sports events such as boxing, mixed martial arts, or other martial arts competitions and training sessions.

The at least one camera device may be positioned to capture video footage of the event area, such as a ring or mat, and may be capable of receiving commands from the control device to start, resume, stop, or pause video recording as required by the timing session.

The control device may be communicatively coupled to the camera device, enabling real-time transmission of commands. The coupling may be achieved via wired or wireless communication protocols, such as Wi-Fi, Bluetooth, or other suitable means, depending on the implementation requirements and the environment in which the system is deployed.

The control device may comprise a user interface for managing a timing session for the combat-sports event. The user interface of the control device may be configured to allow an operator, such as a referee, coach, or event official, to manage the timing session. The timing session may comprise at least a timed activity state and a non-timed rest state. The timed activity state may correspond to periods of active competition or training. The non-timed rest state may correspond to intervals between rounds or periods of inactivity. The user interface may present controls for starting, pausing, resuming, or stopping the timing session, as well as for transitioning between the activity and rest states.

The control device may comprise a controller. The controller within the control device may be programmed to monitor user inputs via the user interface. The controller may be configured to, in response to a user input via the user interface initiating a transition of the timing session from the non-timed rest state to the timed activity state, automatically transmit a first command to the at least one camera device to cause it to start or resume video recording. The controller may be configured to, in response to a user input via the user interface initiating a transition of the timing session from the timed activity state to the non-timed rest state, automatically transmit a second command to the at least one camera device to cause it to stop or pause video recording. This automation ensures that video footage is recorded only during periods of active competition or training, thereby reducing unnecessary storage usage and simplifying the process of reviewing recorded material.

The system may be implemented using commercially available camera devices and control devices, or may be provided as a dedicated, integrated solution. The control device may include additional features, such as visual or audible indicators of the current timing state, data logging of timing events, or interfaces for exporting recorded video and timing data for further analysis or archival purposes.

In embodiments, the control device may be wirelessly coupled to the at least one camera device. This provides flexibility in camera placement throughout the gym without requiring cable connections.

In embodiments, the system may comprise a plurality of camera devices, wherein the controller is configured to transmit the first and second commands to each of the plurality of camera devices. This allows for multiple viewing angles of the combat sports event to be captured simultaneously.

It is possible for the controller to be programmed to address each camera device individually or to broadcast commands to all connected camera devices at once. In this way, when a user input initiates a transition between the non-timed rest state and the timed activity state, or vice versa, all camera devices may start, resume, stop, or pause video recording in a coordinated manner. Such coordination can ensure that the video footage from all cameras is synchronized with the timing session, which can be particularly beneficial for post-event analysis or for producing multi-angle video content.

This multi-camera arrangement can provide comprehensive video coverage and may facilitate advanced features, such as automatic selection of the best camera angle, real-time switching between video feeds, or the creation of composite recordings. The ability to control several camera devices in synchrony with the timing session can greatly enhance the functionality and versatility of the system for both training and competition environments.

In embodiments, the system may comprise three or four camera devices. The use of three or four camera devices can provide enhanced coverage of the combat-sports event area, allowing for the capture of video footage from multiple distinct angles. This arrangement can be particularly beneficial in environments where comprehensive visual documentation is desired, such as for detailed performance analysis, coaching, or event broadcasting.

It is possible for the camera devices to be positioned at various strategic locations around the event space. For example, in a boxing ring or martial arts mat, the cameras might be placed at different corners or sides to ensure that all areas of activity are within the field of view of at least one camera at any given time. Alternatively, one or more of the camera devices could be mounted at elevated positions to provide overhead or wide-angle perspectives.

The inclusion of three or four camera devices can also facilitate advanced features, such as multi-angle replay, automatic selection of the optimal viewing angle, or the creation of composite video streams. In some embodiments, the system may allow the operator to configure which camera devices are active during a session, or to switch between different camera views in real time.

In embodiments, the control device may be a tablet computer comprising an integrated display for the user interface. The tablet computer can provide a portable and compact solution, allowing the operator to manage the timing session and control the camera device or devices from a single, easily accessible unit. The integrated display of the tablet computer may present the user interface, which can include controls for initiating and managing the timing session, as well as visual indicators of the current timing state, such as whether the system is in a timed activity state or a non-timed rest state.

The use of a tablet computer as the control device can offer several advantages. For example, the wireless connectivity capabilities commonly available in tablet computers may facilitate communication with one or more camera devices without the need for additional hardware. The touch-sensitive display can provide an intuitive and user-friendly interface, enabling quick and accurate operation during fast-paced combat-sports events. Additionally, the portability of the tablet computer allows the operator to move freely around the event area, positioning themselves as needed for optimal oversight and control.

Optionally, the tablet computer may be configured to run dedicated software or an application specifically designed for managing the timing and recording functions of the system. This software can be tailored to the requirements of combat-sports events, providing features such as customizable timing intervals, visual and audible alerts, and real-time feedback on the status of the camera devices. In some cases, the tablet computer may also support additional functionalities, such as data logging, exporting timing and video data, or integrating with external systems for event management or broadcasting.

In a further possible implementation, the system may be arranged so that the tablet computer can be mounted on a stand or holder at ringside or in a control booth, providing a stable and convenient location for operation during an event. Alternatively, the tablet computer may be handheld, allowing the operator to remain mobile and responsive to the needs of the event.

In embodiments, the control device may comprise a router, the router being communicatively coupled to the at least one camera device, and wherein the user interface is provided via a web browser or a dedicated application on a separate end-user device communicatively coupled to the router. This allows for flexible control from various devices while maintaining a centralized connection point for the cameras. The router can serve as a central communication hub, facilitating data exchange between the camera device or devices and other components of the system. The connection between the router and the camera device may be established using wired Ethernet, wireless local area network (WLAN), or other suitable networking technologies, depending on the installation environment and user requirements.

Optionally, the user interface for managing the timing session and controlling the camera device may be provided via a web browser or a dedicated application running on a separate end-user device. This end-user device could be, for example, a laptop, desktop computer, tablet, or smartphone, which is communicatively coupled to the router. The use of a web-based or app-based interface allows for flexible and convenient access to the system's control functions from a variety of devices, without requiring direct physical connection to the camera device or the router.

In some configurations, the web browser interface may be accessed by navigating to a specific local network address or URL provided by the router, enabling the operator to interact with the system through standard web technologies. Alternatively, a dedicated application may be installed on the end-user device, offering a customized user experience with additional features or optimized performance.

This arrangement can provide several advantages, such as enabling multiple users to access the control interface simultaneously from different locations within the network or allowing remote operation if the router supports secure external connections. Furthermore, separating the user interface from the core control hardware may facilitate system updates, maintenance, or integration with other event management tools.

It is also conceivable that the router may manage communication with several camera devices, coordinating their operation in response to user commands received via the web browser or application. The system may be configured so that the end-user device receives real-time feedback on the status of the timing session and the camera devices, such as recording state, connectivity, or error notifications.

In alternative implementations, the router may provide additional network services, such as video streaming, data storage, or access control, further enhancing the versatility and scalability of the system for different combat-sports event scenarios.

In embodiments, the user interface may comprise a selectable option to initiate the timing session with video recording, and wherein the controller is configured to transmit the first command only when said option is selected. This gives users control over when recording occurs, helping to manage storage space and processing resources. The controller can be configured so that it transmits the first command to the at least one camera device only when this option is selected. This arrangement allows the operator to choose whether the timing session should be accompanied by video recording or not, providing flexibility according to the requirements of the event or user preference.

Optionally, the selectable option may be presented as a button, toggle, or menu item within the user interface. When the operator selects this option, the system may be arranged such that the initiation of the timing session is automatically linked to the start or resumption of video recording by the camera device. Conversely, if the option is not selected, the controller may refrain from transmitting the first command, and the camera device may remain inactive or in a standby state during the timing session. This feature can be advantageous in situations where video recording is not necessary for every timing session, thereby conserving storage space and reducing unnecessary data management.

In alternative configurations, the user interface may allow the operator to change the selection at any time before or during the timing session, enabling dynamic control over whether video recording is synchronized with the timing session. The system may also provide visual or audible feedback to confirm the current selection and the operational state of the camera device.

In one possible implementation, the timer interface may include distinct “Record with Cam” and “Record without Cam” buttons. Selecting the “Record with Cam” button may initiate both the timer and the camera devices automatically, ensuring that video recording is synchronized with the timing session from the outset. Alternatively, the “Record without Cam” button may allow the operator to start the timer without activating the camera devices, providing a streamlined workflow for sessions where video documentation is not required. This arrangement can enhance usability by making the available options clear and accessible, and by reducing the risk of unintentional recording or missed footage. The system may also be configured to display the selected mode prominently within the user interface, so that the operator can easily verify whether video recording will be active during the timing session.

In embodiments, the controller may be further configured to cause the at least one camera device to stream the video recording in real-time. This enables coaches or spectators to view the activity from alternative angles in real-time, enhancing training or viewing experience. This streaming functionality can be implemented so that, when video recording is initiated or resumed, the camera device is also capable of transmitting a live video feed to one or more designated endpoints. The real-time video stream may be delivered to the control device, to an external display, or to remote viewers via a local network or the internet, depending on the system configuration.

It is possible for the streaming feature to be activated automatically in conjunction with the start of video recording, or alternatively, the operator may be provided with an option within the user interface to enable or disable real-time streaming as desired. The system may support various streaming protocols, such as Real-Time Messaging Protocol (RTMP), Real-Time Streaming Protocol (RTSP), or other suitable standards, to ensure compatibility with a wide range of viewing devices and platforms.

In some arrangements, the real-time video stream can be accessed by authorized users on-site, such as coaches, referees, or event officials, allowing them to monitor the combat-sports event as it unfolds. Alternatively, the stream may be made available to remote participants, such as spectators, judges, or analysts, thereby extending the reach of the event beyond the immediate venue.

The system may also be configured so that the quality and resolution of the real-time video stream are adjustable, enabling adaptation to available network bandwidth or specific user requirements. In certain cases, the streaming capability can be used in parallel with local recording, ensuring that a high-quality video file is saved for later review while a lower-bitrate stream is provided for live viewing.

Optionally, the controller may manage the initiation and termination of the video stream in synchrony with the timing session, so that streaming occurs only during periods of active competition or training. This approach can help to optimize network usage and protect the privacy of participants during rest periods or between sessions.

In further possible embodiments, the system may allow for the real-time stream to be integrated with additional data overlays, such as timer information, participant names, or scoring details, enhancing the value of the live broadcast for viewers. The inclusion of real-time streaming functionality can thus provide significant benefits for event management, remote coaching, live broadcasting, and audience engagement in combat-sports environments.

In some embodiments, the controller may additionally be arranged to generate timing data corresponding to the timing session. This timing data can include information such as the start and end times of the timed activity state, the duration of each round or period, the intervals of the non-timed rest state, and any transitions between these states. The timing data may be recorded in real time as the timing session progresses, capturing precise timestamps or durations for each relevant event.

It is also possible for the controller to associate the generated timing data with the video recording produced by the at least one camera device. This association can be achieved in a variety of ways. For example, the timing data might be embedded directly into the video file as metadata, allowing for synchronized playback and analysis. Alternatively, the timing data could be stored in a separate file or database that is linked to the corresponding video recording through a unique identifier or timestamp correlation.

Optionally, the association of timing data with the video recording enables enhanced review and analysis of combat-sports events. For instance, during playback, the timing information may be displayed as an overlay on the video, indicating the current round, elapsed time, or rest periods. This feature can be particularly useful for coaches, athletes, or officials who wish to analyze performance with reference to specific segments of the event.

In some configurations, the system may allow users to export both the video recording and the associated timing data for further processing or archival purposes. The timing data may be formatted according to standard protocols to facilitate compatibility with external analysis tools or video editing software.

Alternatively, the controller could be configured to generate summary reports or visualizations based on the timing data, such as charts of round durations, rest intervals, or event timelines. These reports may be made available through the user interface or exported for external use.

By optionally generating and associating timing data with the video recording, the system can provide a more comprehensive and informative record of each combat-sports event, supporting detailed review, training optimization, and event documentation.

In certain embodiments, associating the timing data with the video recording may be accomplished in a variety of ways. For example, the timing data can optionally be embedded as metadata within a video file of the video recording. Embedding timing data as metadata allows the timing information to be stored directly within the video file structure, making it accessible to compatible playback devices or analysis software. This approach can facilitate synchronized review of the video alongside precise timing information, enabling users to identify key moments, such as the start and end of rounds or rest periods, directly within the video timeline.

Alternatively, or in addition, the system may be configured to generate a video overlay comprising information derived from the timing data. In this arrangement, the timing information—such as elapsed time, round number, or countdown indicators—can be visually superimposed onto the video frames during recording or playback. The overlay may be presented as text, graphical elements, or a combination thereof, and can be customized in terms of appearance, position, and content according to user preferences or event requirements.

It is also conceivable that both methods could be implemented in parallel, so that timing data is both embedded as metadata and displayed as an overlay, providing maximum flexibility for subsequent analysis and review. In some cases, the system might allow the operator to select which method or combination of methods to use, depending on the intended application or the capabilities of the playback environment.

Optionally, the inclusion of timing data as metadata or as a video overlay can enhance the utility of the recorded footage for coaches, athletes, officials, or analysts by providing immediate visual or programmatic access to key temporal information. This can support more effective performance evaluation, event documentation, or content production for broadcasting or educational purposes.

In further possible implementations, the system may support exporting the video recording with or without the overlay or may provide tools for extracting or editing the embedded metadata, thereby offering additional flexibility in how the timing data is utilized and presented.

In some embodiments, the user interface may additionally be configured to receive an input to associate at least one participant identifier with the timing session. The participant identifier can refer to information that uniquely identifies an individual or group involved in the combat-sports event, such as a name, membership number, athlete ID, or other suitable designation. The association of a participant identifier with the timing session may be accomplished through manual entry by the operator, selection from a predefined list, or scanning of a code or credential.

Optionally, the controller may be further arranged to automatically transmit the video recording to a destination associated with the at least one participant identifier. The destination can include, for example, an email address, a cloud storage account, a secure file server, or a dedicated athlete management platform. The transmission of the video recording may be triggered upon completion of the timing session, upon user confirmation, or according to a predefined schedule or workflow.

This arrangement can streamline the process of distributing recorded footage to participants, coaches, or other stakeholders, reducing the need for manual handling and ensuring that each participant receives the relevant video material in a timely manner. In some configurations, the system may allow the operator to specify multiple participant identifiers and corresponding destinations, enabling the automatic distribution of video recordings to several recipients simultaneously.

Alternatively, the system may provide options for customizing the format, resolution, or metadata of the video recording prior to transmission, or for including additional information such as timing data, event details, or performance notes. The automated transmission feature can be particularly advantageous in training environments, competitions, or athlete development programs where efficient and secure sharing of video content is required In a further possible embodiment, the controller may additionally be arranged to automatically upload the video recording to a cloud-based platform. This functionality can be implemented so that, upon completion of a timing session or at another designated trigger point, the system initiates the transfer of the recorded video file to a remote server or cloud storage service. The cloud-based platform may be any suitable service that supports secure storage and retrieval of video content, such as a commercial cloud provider, a dedicated sports analytics platform, or a custom-managed server.

Optionally, the automatic upload process can be configured to occur in the background, requiring no further user intervention once the recording is complete. In some arrangements, the system might allow the operator to select or configure the target cloud platform, specify access credentials, or define organizational folders or tags for the uploaded files. The upload may be performed using secure protocols to ensure the privacy and integrity of the video data during transmission.

Alternatively, the system could be set up so that the upload is triggered only under certain conditions, such as when a stable network connection is available, when the file size is below a specified threshold, or when the user confirms the upload via the user interface. The controller may also be capable of queuing multiple video recordings for upload, managing retries in the event of network interruptions, or providing status notifications to the operator regarding the progress or completion of the upload.

In some scenarios, the cloud-based platform may offer additional features, such as automated video analysis, sharing with authorized users, or integration with athlete management systems. The ability to automatically upload video recordings to the cloud can facilitate remote access, long-term archiving, and efficient sharing of event footage with coaches, athletes, or other stakeholders, regardless of their physical location.

It is also conceivable that the system may provide options for encrypting the video files prior to upload, or for restricting access to the uploaded content based on user roles or permissions. By enabling automatic cloud upload as an optional feature, the system can enhance the flexibility, security, and accessibility of recorded combat-sports event footage in a variety of operational contexts.

In some implementations, the control device may additionally include a processor that is capable of performing artificial intelligence (AI)-based analysis on the video recording. This processor can be arranged to execute algorithms or models that analyze the recorded footage in order to generate combat-sports statistics or a fight score. The use of AI-based analysis may enable the system to automatically extract relevant information from the video, such as the number of strikes, successful hits, defensive actions, movement patterns, or other performance metrics pertinent to combat-sports events.

Alternatively, the processor could be configured to apply machine learning techniques, such as computer vision or deep learning, to identify and classify specific actions or events within the video recording. For example, the system might be able to detect and count punches, kicks, takedowns, or other techniques, and to associate these actions with particular participants or time intervals. The resulting statistics may be presented to the user via the interface, stored alongside the video recording, or exported for further analysis.

In another possible embodiment, the processor may be arranged to calculate a fight score based on predefined criteria or scoring rules. The fight score could reflect overall performance, technical proficiency, or adherence to competition regulations, and may be used for training evaluation, match judging, or athlete development purposes. The scoring algorithm may be customizable, allowing users to adjust the weighting of different actions or to incorporate sport-specific rules.

Optionally, the AI-based analysis may be performed locally on the control device, or the video recording may be uploaded to an external server or cloud platform where more computationally intensive processing can take place. The results of the analysis, such as statistics or scores, may then be retrieved and displayed to the user or shared with coaches, athletes, or event officials.

It is also conceivable that the system could support integration with third-party analytics platforms, enabling users to leverage specialized AI models or to combine the generated statistics with other performance data. The inclusion of AI-based analysis as a feature can provide valuable insights into combat-sports events, supporting objective assessment, performance tracking, and enhanced feedback for participants and trainers. In some cases, the user may be able to enable or disable the AI analysis function according to their preferences or the requirements of a particular session.

In another aspect, the present disclosure relates to a method for timing and recording combat-sports events. The method may comprise providing a user interface for managing a timing session for a combat-sports event, the timing session comprising at least a timed activity state and a non-timed rest state. The method may comprise receiving a first user input via the user interface initiating a transition of the timing session from the non-timed rest state to the timed activity state. The method may comprise, in response to the first user input, automatically transmitting a first command to at least one camera device to cause it to start or resume video recording. The method may comprise receiving a second user input via the user interface initiating a transition of the timing session from the timed activity state to the non-timed rest state. The method may comprise, and in response to the second user input, automatically transmitting a second command to the at least one camera device to cause it to stop or pause video recording.

In another aspect, the present disclosure relates to a non-transitory computer-readable medium having stored thereon instructions that, when executed by a processor, cause the processor to perform a method comprising providing a user interface for managing a timing session for a combat-sports event, the timing session comprising at least a timed activity state and a non-timed rest state; receiving a first user input via the user interface initiating a transition of the timing session from the non-timed rest state to the timed activity state; in response to the first user input, automatically transmitting a first command to at least one camera device to cause it to start or resume video recording; receiving a second user input via the user interface initiating a transition of the timing session from the timed activity state to the non-timed rest state; and in response to the second user input, automatically transmitting a second command to the at least one camera device to cause it to stop or pause video recording.

Another aspect of the present disclosure relates to a data processing system, apparatus or device. The data processing system, apparatus or device may comprise means for carrying out any combination of steps of the described methods. The data processing system, apparatus or device may comprise a memory and a processor. The memory may store, or be configured to store, instructions that, when executed by the processor, configure the data processing system, apparatus or device to carry out any combination of steps of the described methods.

Another aspect of the present disclosure relates to a computer program. Another aspect of the present disclosure relates to a non-transitory computer-readable medium having stored thereon a computer program. In both cases, the computer program may comprise instructions which, when the program is executed by a computer, such as the mentioned data processing system, apparatus or device, cause the computer to carry out any combination of steps of the described methods. A computer program may also be referred to as a program, software, a software application, an app, a module, a software module, a script, or code. A computer program may be written in a programming language, including compiled or interpreted languages. A computer program may be deployed in any form, including as a stand-alone product or as a module, component, subroutine, or other unit suitable for use in a computing environment, such as on the mentioned data processing system, apparatus or device.

It is an advantage of embodiments of the present disclosure that the timer and camera control can be merged into one combined system, simplifying the gym workflow.

It is a further advantage of embodiments of the present disclosure that a single user interface can simultaneously coordinate timing and video recording, thus reducing the need to operate multiple systems.

It is a further advantage of embodiments of the present disclosure that the system can wirelessly connect to multiple cameras, offering comprehensive coverage of the combat-sports activity.

It is a further advantage of embodiments of the present disclosure that an out-of-the-box solution can be provided using a tablet as a control device, ensuring convenient setup and operation.

It is a further advantage of embodiments of the present disclosure that a router-based control device can be installed at a gym location, enabling remote user-interface access via a browser or app.

It is a further advantage of embodiments of the present disclosure that the system can automatically tag participants, allowing for seamless sharing of recorded videos with fighters.

It is a further advantage of embodiments of the present disclosure that the recorded or streamed videos can be enriched with timing data such as round starts, stops, and breaks.

It is a further advantage of embodiments of the present disclosure that the risk of forgetting to start or stop the recording can be reduced, because the system triggers video recording based on the fight timer.

It is a further advantage of embodiments of the present disclosure that complex inference-based artificial intelligence for detecting fight status may be avoided, since the timing session is integrated directly into the video.

It is a further advantage of embodiments of the present disclosure that extensive statistics can be generated through a cloud platform when videos are automatically uploaded.

It is a further advantage of embodiments of the present disclosure that an integrated artificial intelligence module can count statistics and help score fights, further enhancing combat-sports analysis.

The following terms are provided solely to aid in the understanding of the disclosure:

As used herein, and unless otherwise specified, the term "combat-sports event" refers to any competitive or training activity involving physical engagements between participants, such as boxing, mixed martial arts, kickboxing, or similar contact sports. Examples of combat-sports events within this term include amateur boxing matches, professional mixed martial arts contests, or sparring sessions in a gym environment.

As used herein, and unless otherwise specified, the phrase "camera device" refers to any electronic apparatus capable of capturing moving images in digital or analog form. Examples of camera devices within this phrase include standalone digital video cameras, DSLR or mirrorless cameras with video functionality, action cameras, smartphone-integrated cameras, and camcorders.

As used herein, and unless otherwise specified, the term "control device" refers to any hardware component, computing system, or combination thereof that manages or oversees operations associated with the timing session and the camera device(s). Examples of control devices within this term include tablet computers with touchscreens, laptop or desktop computers, dedicated hardware consoles, and embedded systems incorporating a processor and relevant software.

As used herein, and unless otherwise specified, the phrase "user interface" refers to any display-based, software-based, or hardware-based means through which a user can interact with the system to manage or observe the timing session or video recording functionalities. Examples of user interfaces within this phrase include graphical user interfaces on a touchscreen, web-based dashboards accessible through a browser, or physical control panels with buttons or switches.

As used herein, and unless otherwise specified, the term "timing session" refers to a controlled session that tracks and manages intervals of activity and rest during a combat-sports event. Examples of timing sessions within this term include boxing rounds interspersed with rest periods, timed sparring rounds in martial arts, or structured interval training sessions with designated fight time and recovery intervals.

As used herein, and unless otherwise specified, the phrase "timed activity state" refers to a designated period within the timing session during which active engagement or combat practice is taking place and the timer is running. Examples of timed activity states within this phrase include a round of sparring, a boxing round in progress, or any other segment in which participants are expected to be actively engaging in the combat-sports event.

As used herein, and unless otherwise specified, the phrase "non-timed rest state" refers to a designated period within the timing session during which the active engagement is paused or halted, and the timer is inactive. Examples of non-timed rest states within this phrase include a break between rounds, a pause for a coach's instructions, or an interval for water breaks in a training session.

As used herein, and unless otherwise specified, the term "controller" refers to the logical or hardware-based control unit, which may include one or more processors, configured to execute instructions governing transitions between timed states, transmissions of commands to camera devices, and other operational aspects of the system. Examples of controllers within this term include software modules running on a tablet computer, microcontrollers integrated into a custom device, or central processing units in a server managing system communications.

As used herein, and unless otherwise specified, the expression "start or resume video recording" refers to sending an instruction to commence the capture of live video or recommence the capture after pausing. Examples of starting or resuming video recording within this expression include pressing a digital button on a touchscreen, clicking a control within a web-based solution, or issuing a voice command that triggers the camera device to begin or continue recording.

As used herein, and unless otherwise specified, the expression "stop or pause video recording" refers to sending an instruction to halt the capture of live video, either concluding the recording session entirely or suspending it temporarily. Examples of stopping or pausing video recording within this expression include pressing a designated stop button, selecting a pause icon on a touchscreen, or issuing a voice command to halt video capture.

As used herein, and unless otherwise specified, the phrase "wirelessly coupled" refers to a connection or communication link established between two devices without the use of physical cables, typically through radio frequency-based technologies, infrared signals, or comparable means. Examples of wireless coupling within this phrase include Wi-Fi and Bluetooth connections, an ad-hoc wireless network, or a cellular data link.

As used herein, and unless otherwise specified, the term "metadata" refers to ancillary data associated with a primary recording, file, or data stream that provides descriptive, administrative, or structural details regarding the primary data. Examples of metadata within this term include timestamps appended to video recordings, embedded identifiers for participants, or text-based data describing camera settings and event context.

As used herein, and unless otherwise specified, the phrase "cloud-based platform" refers to any remote computing or storage service accessible via a network connection, allowing users to store, retrieve, or process data over the internet or a similar communication infrastructure. Examples of cloud-based platforms within this phrase include hosted services like Amazon Web Services, Microsoft Azure, or proprietary remote video-hosting environments.

As used herein, and unless otherwise specified, the expression "artificial intelligence-based analysis" refers to automated processing methods utilizing machine learning algorithms, computer vision techniques, or data-driven models to interpret and evaluate video or related information. Examples of artificial intelligence-based analysis within this expression include recognizing specific moves in martial arts footage, providing fighter performance analytics, or generating compiled highlights based on recognized patterns.

Particular and preferred aspects of the disclosure are set out in the accompanying independent and dependent claims. Features from the dependent claims may be combined with features of the independent claims and with features of other dependent claims as appropriate and not merely as explicitly set out in the claims.

BRIEF DESCRIPTION OF THE DRAWINGS

The above and other characteristics, features and advantages of the present disclosure will become apparent from the following detailed description, taken in conjunction with the accompanying drawings, which illustrate, by way of example, the principles of the disclosure. This description is given for the sake of example only, without limiting the scope of the disclosure. The reference figures quoted below refer to the attached drawings.

FIG. 1 illustrates a schematic block diagram of a system for timing and recording combat-sports events in accordance with one embodiment.

FIG. 2 illustrates a method for timing and recording combat-sports events in accordance with one embodiment.

FIG. 5 illustrates a perspective back view of a control device in accordance with one embodiment.

FIG. 6 illustrates perspective front and back views of a camera device in accordance with one embodiment.

FIG. 7 illustrates front, back and side views of a camera device in accordance with one embodiment.

DETAILED DESCRIPTION

Figure 3:
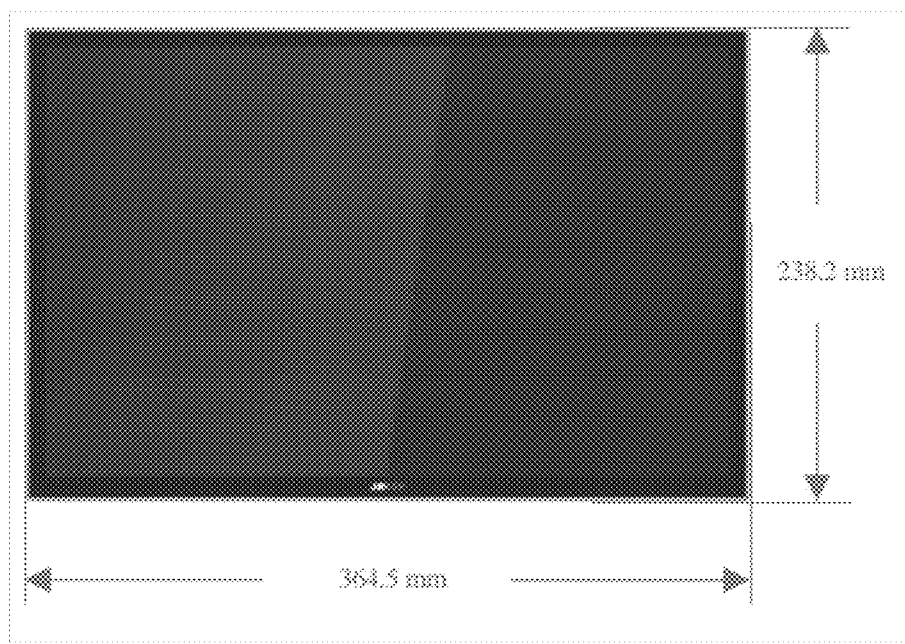
FIG. 3 illustrates a front view of a control device in accordance with one embodiment.

In the following, representative embodiments illustrated in the accompanying drawings will be explained. It should be understood that the illustrated embodiments and the following descriptions refer to examples which are not intended to limit the embodiments to one preferred embodiment.

Certain embodiments relate to a system and method for timing and recording combat sports events that integrates fight timer functionality with camera control. This addresses the limitations of conventional gym setups where timers and camera systems operate independently, requiring separate activation and management, which often leads to workflow inefficiencies and missed recording opportunities.

FIG. 1 illustrates a schematic block diagram of a system 100 for timing and recording combat-sports events in accordance with one embodiment.

In the illustrated embodiment, the system 100 comprises two primary components: at least one camera device 104, preferably a plurality of camera devices 104, and a control device 102 communicatively coupled to the camera devices 104. This integrated architecture enables synchronized operation between the timing functions for combat sports training or competition and the video recording capabilities for performance analysis and documentation. The control device 102 and camera devices 104 operate as a unified system through a communication protocol that allows the control device 102 to transmit commands to the camera devices 104 based on the state of the timing session. The communication between these components may be established through wireless protocols such as Wi-Fi, Bluetooth, ZigBee, or other suitable wireless communication technologies.

In one embodiment, the control device 102 is implemented as a tablet computer with an integrated display that presents the user interface 106. The tablet-based implementation provides a portable, self-contained unit that can be easily positioned within a combat sports facility. The tablet's touchscreen capabilities allow for intuitive interaction with the timing and recording controls.

In an alternative embodiment, the control device 102 functions as a router-like device that can be permanently installed within the combat sports facility. In this configuration, the control device 102 communicatively connects to the camera devices 104 while also providing network connectivity for end-user devices. The user interface 106 can then be delivered through a web browser or a dedicated application running on a separate end-user device, such as a smartphone, tablet, or computer. This architecture allows for flexible access to the system's controls from multiple devices within the facility.

In certain embodiments, the control device 102 includes a controller 108, which may be implemented using a microprocessor, microcontroller, application-specific integrated circuit (ASIC), field-programmable gate array (FPGA), or other suitable processing hardware. The controller 108 executes software instructions that implement the timing functions, user interface operations, and camera control logic.

In certain embodiments, the system 100 supports configurations with one or more camera devices 104. In preferred embodiments, the system 100 includes three or four camera devices 104 strategically positioned to capture combat sports activities from multiple angles. This multi-camera approach ensures comprehensive coverage of the training or competition area, allowing for more effective performance analysis.

In certain embodiments, each camera device 104 includes video capture hardware capable of recording high-definition video, internal storage for temporary or long-term storage of recorded video, and communication hardware for receiving commands from the control device 102. The camera devices 104 may also include capabilities for local processing of video data, compression, and streaming.

In certain embodiments, the camera devices 104 are designed to respond to commands from the control device 102 that initiate, pause, resume, or stop video recording. These commands are triggered automatically based on the state transitions of the timing session managed through the control device's user interface 106.

In certain embodiments, the user interface 106 presented by the control device 102 resembles a conventional fight timer in its basic functionality but extends this paradigm with integrated camera control features. The user interface 106 displays timing information relevant to combat sports, such as round time, rest period time, and session progress.

In certain embodiments, the user interface 106 includes controls for initiating and managing timing sessions, with distinct states for timed activity (e.g., rounds of sparring or competition) and non-timed rest periods. These controls may be implemented as touchscreen buttons, physical buttons, or a combination thereof, depending on the control device embodiment.

In certain embodiments, the user interface 106 includes a selectable option labeled "Record with Cam" that, when activated, configures the system to automatically control the camera devices 104 based on timing session state transitions. An alternative option labeled "Record without Cam" allows the timer functionality to operate independently of the camera devices 104 when video recording is not desired.

In certain embodiments, the user interface 106 may also provide controls for tagging specific participants in a session, configuring camera settings, and accessing recorded video for playback or distribution.

FIG. 2 illustrates a routine 200 for timing and recording combat-sports events in accordance with one embodiment. In block 202, routine 200 provides a user interface 106 for managing a timing session for a combat-sports event, the timing session comprising at least a timed activity state and a non-timed rest state. In block 204, routine 200 receives a first user input via the user interface 106 initiating a transition of the timing session from the non-timed rest state to the timed activity state. In block 206, routine 200 in response to the first user input, automatically transmits a first command to at least one camera device 104 to cause it to start or resume video recording. In block 208, routine 200 receives a second user input via the user interface 106 initiating a transition of the timing session from the timed activity state to the non-timed rest state.

In block 210, routine 200 in response to the second user input, automatically transmit a second command to the at least one camera device 104 to cause it to stop or pause video recording.

In certain embodiments, the system 100 and method 200 can operate in various modes that define how the timing and recording functions interact:

1. Integrated Timing and Recording Mode: In this primary mode, the system 100 automatically synchronizes camera operations with timing session states. When a user initiates a transition from a non-timed rest state to a timed activity state (e.g., starting a round), the control device 102 automatically transmits a command to all connected camera devices 104 to start or resume video recording (first command). Conversely, when the timing session transitions from a timed activity state to a non-timed rest state (e.g., ending a round), the control device 102 automatically commands the camera devices 104 to stop or pause recording (second command).
2. Timer-Only Mode: When video recording is not required, the system 100 can operate solely as a timer, providing the timing functionality without activating the camera devices 104.
3. Manual Override Mode: The system 100 may allow manual control of the camera devices 104 independent of the timing session state, providing flexibility for scenarios that don't fit the standard timing pattern.
4. Streaming Mode: In addition to recording, the system 100 can be configured to stream video in real-time to designated devices or platforms, allowing remote viewing of training or competition sessions.

In certain embodiments, one feature is the integration of timing data with the video recordings. The control device 102 can generate timing data corresponding to the timing session, including round starts and stops, rest periods, and any pauses or interruptions. This timing data can be associated with the video recordings in multiple ways:

1. Metadata Embedding: The timing data is embedded as metadata within the video file, creating a permanent association between the timing information and the video content.
2. Video Overlay: The system 100 can generate a video overlay that displays timing information directly on the video image, such as round number, elapsed time, or remaining time.
3. Synchronized Data File: A separate data file containing detailed timing information can be generated and linked to the video file, allowing for flexible use of the timing data in analysis applications.

This integration eliminates the need for complex systems to infer timing information from the video content alone, which can be particularly challenging in the chaotic environment of combat sports.

In certain embodiments, the system 100 and method 200 can facilitate the distribution of recorded videos to participants and other stakeholders through several mechanisms:

1. Participant Tagging: The user interface 106 allows coaches or administrators to associate participant identifiers with specific timing sessions. These identifiers can be linked to contact information or accounts on a cloud platform. When a session is completed, the system 100 can automatically transmit the relevant video recordings to destinations associated with the tagged participants.
2. Cloud Upload: The system 100 can automatically upload video recordings to a cloud-based platform, where they can be accessed, reviewed, and shared by authorized users. This cloud integration enables remote access to training or competition footage.
3. Local Network Sharing: Within the facility's network, the system 100 can make recordings available to connected devices, allowing immediate review on smartphones, tablets, or computers.

In certain embodiments, the system 100 supports one or more of several advanced features that extend its basic functionality:

1. Artificial Intelligence Analysis: The control device 102 may include or connect to a processor configured to perform artificial intelligence-based analysis on the video recordings. This analysis can generate combat sports statistics, such as strike counts, movement patterns, or defensive effectiveness, and can even produce a fight score for competitive scenarios. The integration of timing data with the video enhances the accuracy of this analysis by providing context for the AI algorithms.
2. Integration with Advanced Analytics Platforms: The system 100 can interface with specialized platforms for automated evaluation and video production of combat sports events, as referenced in the related patent application. This integration leverages the synchronized timing and video data to produce comprehensive analytics and highlight compilations.

3. Multi-session Management: For facilities with multiple training areas, the system 100 can manage separate timing sessions and camera sets for each area, allowing concurrent operation of independent sessions.
4. User Account Management: The system 100 can include user account functionality that allows participants to access their historical recordings, track progress over time, and manage their preferences for video distribution.

Through this comprehensive integration of timing and recording functions, the system 100 significantly streamlines the workflow in combat sports facilities while enhancing the quality and accessibility of video documentation for training and competition purposes.

FIG. 3 to FIG. 7 illustrate various views of one possible implementation of the control device 102 and camera devices 104 in accordance with embodiments of the present disclosure. The illustrated measurements are provided as examples only.

FIG. 3 illustrates a front view of a control device 102 in accordance with one embodiment.

Figure 4:
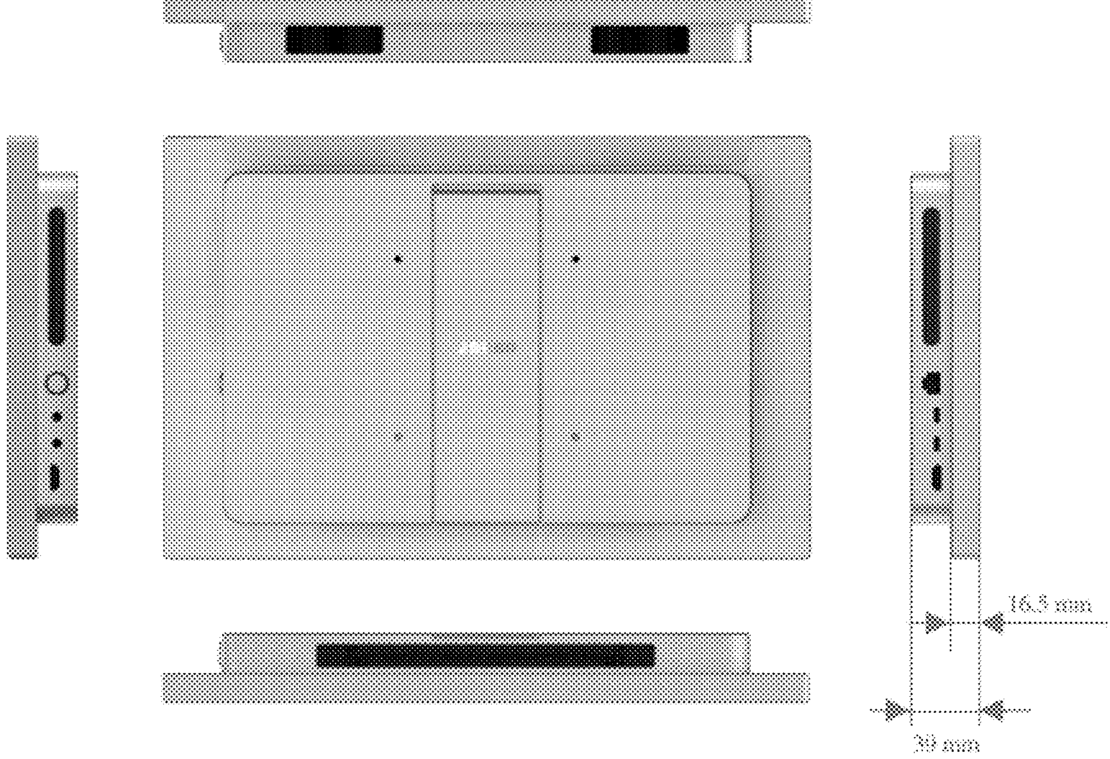
FIG. 4 illustrates back and side views of a control device in accordance with one embodiment.

FIG. 4 illustrates back and side views of a control device 102 in accordance with one embodiment.

FIG. 5 illustrates a perspective back view of a control device 102 in accordance with one embodiment.

FIG. 6 illustrates perspective front and back views of a camera device 104 in accordance with one embodiment.

FIG. 7 illustrates front, back and side views of a camera device in accordance with one embodiment.

While various aspects and embodiments have been illustrated and described in detail in the foregoing description and the drawings, such illustration and description is illustrative or exemplary and not restrictive. Variations to the disclosed embodiments can be understood and effected by those skilled in the art in practicing the claimed subject-matter, from a study of the drawings, the disclosure, and the appended claims.

Although some aspects have been described in the context of a product, apparatus, device or system, these aspects also represent a description of the corresponding process, method or use, where a block or component corresponds to a method step or a feature of a method step. Analogously, aspects described in the context of a method step also represent a description of a corresponding block or component or feature of a corresponding product, apparatus, device or system.

The order of execution of the operations in the described embodiments is not essential, unless otherwise specified. That is, the operations may be performed in any order, unless otherwise specified, and embodiments may include additional or fewer operations than those mentioned.

In the claims, the word "comprising" does not exclude other elements or steps, and the indefinite article "a" or "an" does not exclude a plurality. A single entity may fulfill the functions of several entities recited in the claims. The mere fact that certain measures are recited in mutually different dependent claims does not indicate that a combination of these measures cannot be used to advantage. Any reference signs in the claims should not be construed as limiting the scope.

Embodiments of the present disclosure can be implemented in hardware, software, or both. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer-readable.

Embodiments of the present disclosure can be implemented on a computer system. The computer system may be a local computer device (e.g., personal computer, laptop, tablet computer or mobile phone) with one or more processors and one or more storage devices or may be a distributed computer system (e.g., a cloud computing system with one or more processors and one or more storage devices distributed at various locations, for example, at a local client and/or one or more remote server farms and/or data centers). The computer system may comprise any circuit or combination of circuits. In one embodiment, the computer system may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), or any other type of processor or processing circuit. Other types of circuits that may be included in the computer system may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system may also include a display device, one or more speakers, and a keyboard and/or controller, which can include a mouse, trackball, touch screen, voice-recognition device, or any other device that permits a system user to input information into and receive information from the computer system. Some or all of the method steps may be executed by (or using) a hardware apparatus, like for example, a processor, a microprocessor, a programmable computer or an electronic circuit. In some embodiments, some one or more of the described method steps may be executed by such an apparatus. A further embodiment is an apparatus as described herein comprising a processor and a storage medium.

Embodiments of the present disclosure can be implemented as a computer program (product) with a program code, the program code being operative for performing one of the methods when the computer program product runs on a computer. The program code may, for example, be stored on a machine-readable carrier. Other embodiments comprise a computer program for performing one of the methods described herein, stored on a machine-readable carrier. A further embodiment is a computer program having a program code for performing one of the methods described herein, when the computer program runs on a computer. A further embodiment is a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitory. A further embodiment is a computer having installed thereon the computer program for performing one of the methods described herein, or individual steps thereof.

A further embodiment is a data stream or a sequence of signals representing the computer program for performing one of the methods described herein. The data stream or the sequence of signals may, for example, be configured to be transferred via a data communication connection, for example, via the internet.

A further embodiment is an apparatus or a system configured to transfer (e.g., electronically or optically) a computer program for performing one of the methods described herein to a receiver. The receiver may, for example, comprise a computer, a mobile device, a memory device or the like. The apparatus or system may, for example, comprise a file server for transferring the computer program to the receiver.

REFERENCE SIGNS

100 system
102 control device
104 camera device
106 user interface
108 controller
200 routine
202 block
204 block
206 block
208 block
210 block

The invention claimed is:

1. A system for timing and recording combat-sports events, comprising:
at least one camera device; and
a control device communicatively coupled to the at least one camera device, the control device comprising:
a user interface for managing a timing session for the combat-sports event, the timing session comprising at least a timed activity state corresponding to a round of the combat-sports event and a non-timed rest state; and
a controller configured to:
in response to a user input via the user interface initiating a transition of the timing session from the non-timed rest state to the timed activity state through a record-with-cam user interface control, automatically initiate a timer and transmit a first command to the at least one camera device to cause it to start or resume video recording;
in response to a user input via a record-without-cam user interface control, automatically initiate the timer without activating the at least one camera device; and
in response to a user input via the user interface initiating a transition of the timing session from the timed activity state to the non-timed rest state, automatically transmit a second command to the at least one camera device to cause it to stop or pause video recording.

2. The system of claim 1, wherein the control device is wirelessly coupled to the at least one camera device.

3. The system of claim 1, comprising a plurality of camera devices, wherein the controller is configured to transmit the first and second commands to each of the plurality of camera devices.

4. The system of claim 3, comprising three or four camera devices.

5. The system of claim 1, wherein the control device is a tablet computer comprising an integrated display for the user interface.

6. The system of claim 1, wherein the control device comprises a router, the router being communicatively coupled to the at least one camera device, and wherein the user interface is provided via a web browser or a dedicated application on a separate end-user device communicatively coupled to the router.

7. The system of claim 1, wherein the controller is further configured to cause the at least one camera device to stream the video recording in real-time.

8. The system of claim 1, wherein the controller is further configured to generate timing data corresponding to the timing session, and to associate the timing data with the video recording.

9. The system of claim 8, wherein associating the timing data comprises at least one of embedding the timing data as metadata within a video file of the video recording, or generating a video overlay comprising information derived from the timing data.

10. The system of claim 1, wherein the user interface is further configured to receive an input to associate at least one participant identifier with the timing session, and wherein the controller is further configured to automatically transmit the video recording to a destination associated with the at least one participant identifier.

11. The system of claim 1, wherein the controller is further configured to automatically upload the video recording to a cloud-based platform.

12. The system of claim 1, wherein the control device further comprises a processor configured to perform artificial intelligence-based analysis on the video recording to generate combat-sports statistics or a fight score.

13. A method for timing and recording combat-sports events, comprising:
providing a user interface for managing a timing session for a combat-sports event, the timing session comprising at least a timed activity state corresponding to a round of the combat-sports event and a non-timed rest state, the user interface comprising a record-with-cam user interface control and a record-without-cam user interface control;
in response to receiving a user input via the record-with-cam user interface control initiating a transition of the timing session from the non-timed rest state to the timed activity state, automatically initiating a timer and transmitting a first command to at least one camera device to cause it to start or resume video recording; and
in response to receiving a user input via the record-without-cam user interface control, automatically initiating the timer without activating the at least one camera device;
receiving a user input via the user interface initiating a transition of the timing session from the timed activity state to the non-timed rest state; and
in response to said user input, automatically transmitting a second command to the at least one camera device to cause it to stop or pause video recording.

14. A non-transitory computer-readable medium having stored thereon instructions that, when executed by a processor, cause the processor to perform a method comprising:
providing a user interface for managing a timing session for a combat-sports event, the timing session comprising at least a timed activity state corresponding to a round of the combat-sports event and a non-timed rest state;

receiving a first user input via the user interface initiating a transition of the timing session from the non-timed rest state to the timed activity state through a record-with-cam user interface control;

in response to the first user input, automatically transmitting a first command to at least one camera device to cause it to start or resume video recording;

receiving a user input via a record-without-cam user interface control, and in response to said user input, automatically initiating the timer without activating the at least one camera device;

receiving a second user input via the user interface initiating a transition of the timing session from the timed activity state to the non-timed rest state; and in response to the second user input, automatically transmitting a second command to the at least one camera device to cause it to stop or pause video recording.

* * * * *